No. 846,387. PATENTED MAR. 5, 1907.
C. C. BEEBE.
MATERIAL OF FABRIC AND RUBBER.
APPLICATION FILED MAR. 19, 1906.

Witnesses
Jas. J. Maloney
W. P. Coumey

Inventor
Charles C. Beebe
by J. P. and N. J. Livermore
Attys.

UNITED STATES PATENT OFFICE.

CHARLES C. BEEBE, OF ARLINGTON, MASSACHUSETTS.

MATERIAL OF FABRIC AND RUBBER.

No. 846,387.　　Specification of Letters Patent.　　Patented March 5, 1907.

Application filed March 19, 1906. Serial No. 306,737.

*To all whom it may concern:*

Be it known that I, CHARLES C. BEEBE, a citizen of the United States, residing in Arlington, in the county of Middlesex and State of Massachusetts, have invented an Improvement in Material of Fabric and Rubber, of which the following description, in connection with the accompanying drawings, is a specification, like letters on the drawings representing like parts.

The present invention relates to material for making treads—such as shoe heels, soles, horseshoe-pads, and the like—and is embodied in material formed of layers of duck, sheeting, or other fabric which has been previously permeated with rubber, the said layers being united by means of what is technically known as "friction," or cement, or by the addition of a small quantity of rubber or rubber compound and the whole then vulcanized.

The invention further relates to a process of producing the material, in accordance with which the layers cut to the proper shape and assembled in contact with each other are placed in a suitable mold which contains a small amount of rubber or rubber-cement, the mold being slightly larger than the layers of material, so that when the said material is forced into the mold under pressure the rubber in the mold will flow so as completely to surround the material, thus forming a thin layer of rubber along the outer surface. The mold, with the material therein, is subjected to heat, when pressure is applied, so as to cure the unvulcanized rubber and solidify the material throughout, the finished material thus having the appearance and some of the characteristics of solid rubber, although it really is mainly composed of fabric.

Figure 1:
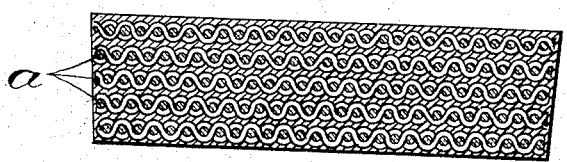
Figure 2:
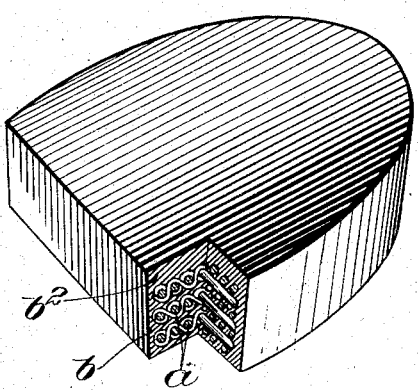
Figure 3:
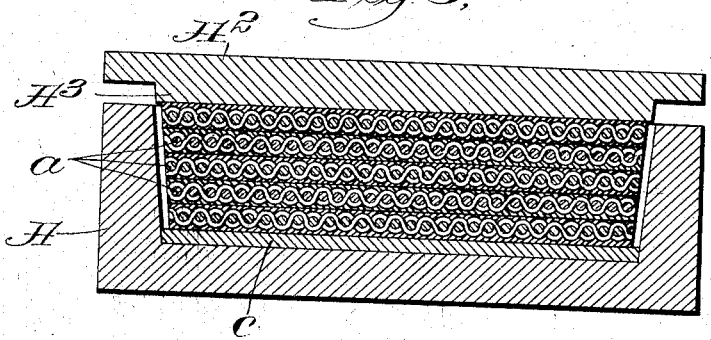
Figure 4:
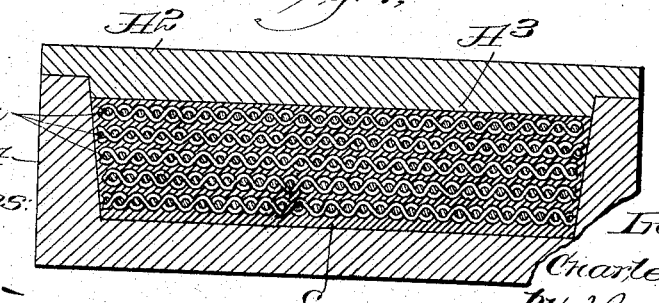

Figure 1 is a vertical section through a piece of material embodying the invention, being herein shown as adapted for use as a shoe-heel. Fig. 2 is a perspective view with parts broken out, showing a heel in which there is an additional quantity of rubber above the tread portion. Fig. 3 is a sectional view of a mold with the material assembled therein; and Fig. 4 is a view similar to Fig. 3, showing the mold closed and the material compressed therein preparatory to being vulcanized.

In order to conform to the requirements of the Patent Office, in illustrating the fabric it has been necessary to exaggerate the thickness of the layers of fabric and rubber, and it is to be understood, therefore, that in the actual material there are a larger number of layers than are shown in the drawings.

As shown in Fig. 1, the tread material is mainly composed of fabric—such as canvas, cotton-duck, or sheeting—the layers $a$ of the material being permeated with rubber and cut to the proper shape and assembled in layers, as shown. After the layers are assembled the edges may be treated with a quantity of what is known as "cement" or any other suitable form of rubber or rubber compound and subsequently vulcanized under pressure, the rubber already existing in the fabric cohering to unite adjacent layers, while the thin film of rubber produces a proper finish around the edge.

In Fig. 2 is shown a heel in which there is a quantity of rubber $b^2$ above the tread portion in addition to the rubber indicated by the letter $b$ along the outer surface or edge of the tread. The quantity of additional rubber, as well as the location thereof, may be varied, it being understood, however, that in all cases the tread portion proper consists mainly of fabric.

Since the essential characteristic of the material used in connecting together the fabric to produce the finished heel is its capability of being hardened by vulcanizing, I wish it to be understood that by the term "rubber," as herein used, I mean to include rubber compound, cement, friction, or any other equivalent substance.

When the tread portion is built up of fabric permeated with rubber containing curing qualities, the additional rubber may be applied along the edges only. If the fabric does not contain uncured rubber, it is desirable to roughen the surface of the layers and to apply cement between same as well as around the edges, so that all the layers may be firmly united.

The invention further relates to the process of producing the tread substance, which process may be described as follows:

Referring to Fig. 3, the layers $a$ of fabric previously permeated with rubber are cut to the proper shape and assembled in layers or plies, as shown in Fig. 3, in a suitable mold A, the said mold also containing an additional amount of rubber $c$, which may be rubber placed in the bottom of the mold or cement or other rubber previously applied to the assembled layers $a$.

As indicated in Fig. 3, the rubber $c$ is shown as placed in the bottom of the mold A, so that when the mold-cover $A^2$ is pressed into place to force the assembled material into the mold under pressure the rubber c will flow up and cover the edges of the tread portion, as indicated in Fig. 4. The process is substantially the same when rubber in the form of cement or otherwise is applied to the surface of the material, the pressure in the mold serving to distribute the rubber and finish the outer surface of the material. The portion $A^2$ of the mold is herein shown as provided with a plunger $A^3$, which fits the top of the mold, this construction, however, not being essential to the invention.

The final step in the process consists in vulcanizing the rubber while the material is contained in the mold under pressure.

It will be seen from the foregoing description that tread material embodying the present invention has for its principal component a fabric of very high wear-resisting quality, there being, however, sufficient rubber to give a solid appearance to the tread material, to prevent the edges of the fabric from fraying, and to afford also a certain amount of resiliency which could not be obtained if the fabric alone were employed. Furthermore, the rubber constitutes a binding material, whereby the layers of fabric are held together, the rubber and fabric combined, furthermore, being much more capable of resisting wear than either material taken by itself.

What I claim is—

1. The herein-described material which consists of a series of parallel adjacent layers of fabric which has been treated with rubber, combined with a uniting and finishing film of rubber of material thickness, completely inclosing the edges of the layers of fabric.

2. The herein-described material which consists of a tread portion comprising a series of parallel adjacent layers of fabric the surfaces of which have been treated with rubber, combined with a uniting and finishing film of rubber along the edges of said adjacent layers to inclose said edges; and a portion of solid rubber in addition to the tread portion.

In testimony whereof I have signed my name to this specification in the presence of two subscribing witnesses.

CHARLES C. BEEBE.

Witnesses:
H. J. LIVERMORE,
W. E. COVENLY.